2 Sheets—Sheet 1.
D. B. CLEMENT.
Hay Tedder
No. 92,166. Patented July 6, 1869.
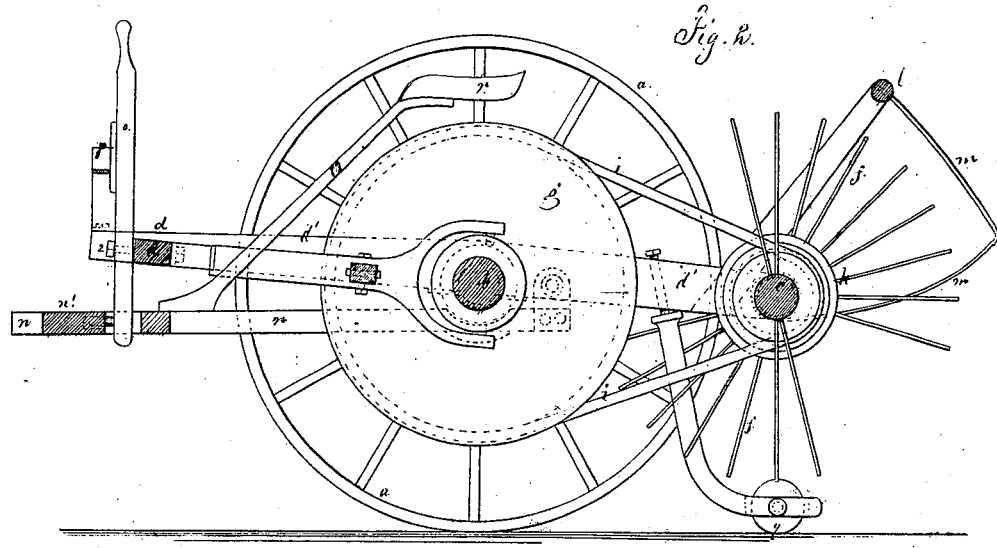
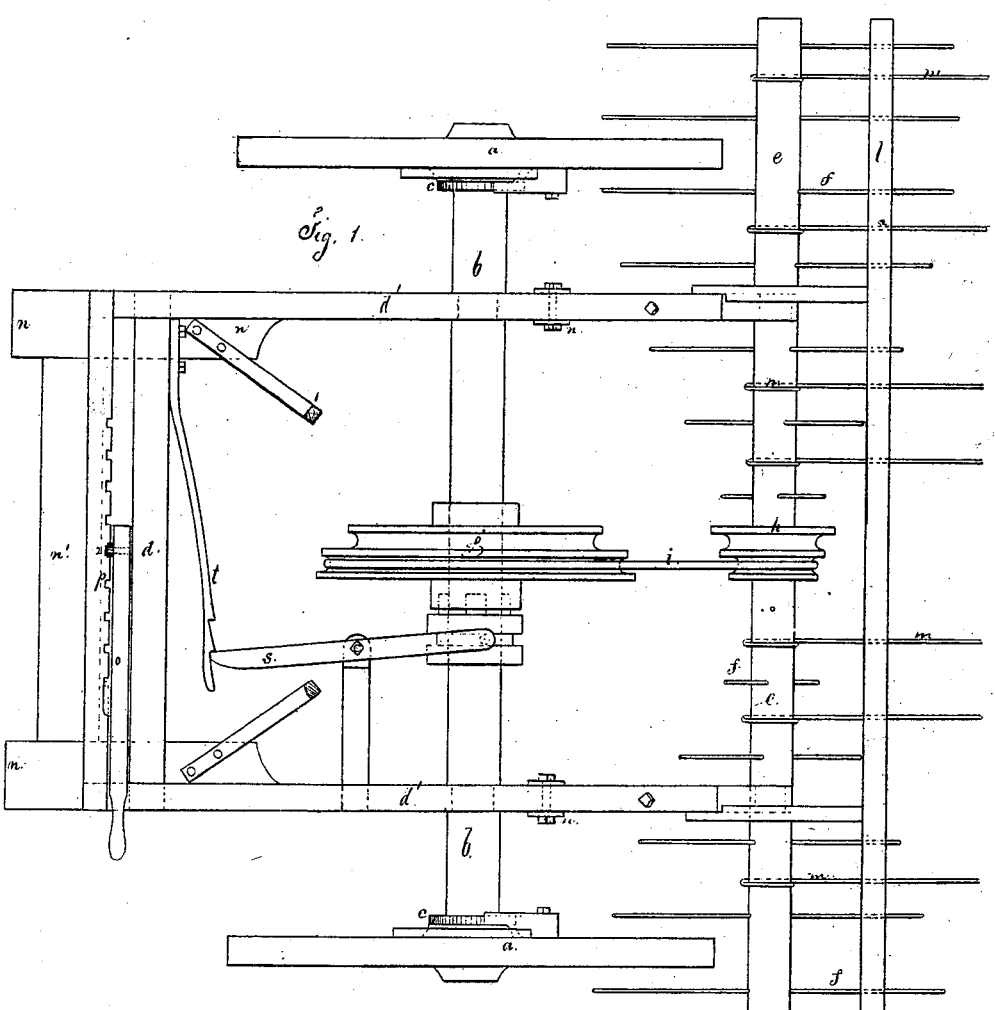
Witnesses
Chas. H. Smith
Geo. W. Walker
Daniel B. Clement
L. W. Serrell, Atty
N. PETERS, Photo-Lithographer, Washington, D. C.

D. B. CLEMENT.
Hay Tedder

No. 92,166. Patented July 6, 1869.

Witnesses,
Chas H Smith
Geo. D Walker

Daniel B. Clement
L. W. Serrell
Atty.

United States Patent Office.

DANIEL B. CLEMENT, OF BRIGHTON, MASSACHUSETTS, ASSIGNOR TO HIMSELF AND DUANE H. NASH, OF NEW YORK CITY.

Letters Patent No. 92,166, dated July 6, 1869.

IMPROVEMENT IN HAY-SPREADERS.

The Schedule referred to in these Letters Patent and making part of the same.

*To all whom it may concern:*

Be it known that I, DANIEL B. CLEMENT, of Brighton, in the county of Suffolk, and State of Massachusetts, have invented and made a new and useful Improvement in Hay-Making Machines; and I do hereby declare the following to be a full, clear, and exact description of the said invention, reference being had to the annexed drawing, making part of this specification, wherein—

Figure 1 is a plan of said machine, the seat being removed;

Figure 2 is a longitudinal section of the same; and

Similar marks of reference denote the same parts.

Figure 3:
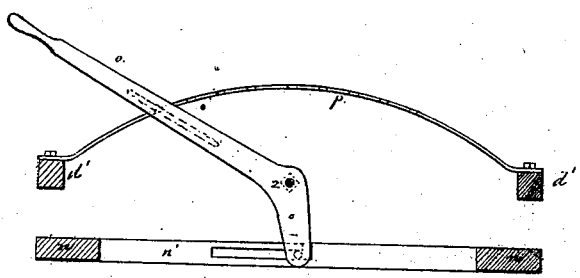
Figure 3 represents the elevating or depressing-lever.

This invention is for stirring up and turning over grass in the progress of hay-making.

Said invention consists in a rake-head carrying teeth, which head is revolved by a pulley, and band to a pulley, on the axle of the supporting-wheels, and the frame of the machine is jointed to the shafts, so that the rake can be raised or lowered by a lever, to facilitate the action of the machine in fields with varying surfaces, and to allow for raising the rake in going to or returning from the field.

In the drawing—

$a\ a'$ are the main supporting-wheels of the machine; $b$ is the axle; and $c\ c$, ratchet-wheels between the wheels $a$ and axle $b$, to allow for backing or turning, but insuring the revolution of the axle, when the machine is drawn ahead.

The axle $b$ is set in the frame that is made with side-pieces $b'$, resting upon the axle $b$, and extending to the rear, where they receive the bearings for the revolving head $e$, said head being formed with ranges or series of spring-teeth $f$.

Upon the axle $b$ is a cone of pulleys, $g$, and a reverse cone of pulleys, $h$, is placed on the revolving head $e$, and the pulleys are connected by the belt $i$, that may be an elastic contractile rubber belt, or a chain may be used.

A bar, $l$, is supported from the frame $d'$, and contains a series of spring clearing-rods, $m$, that extend to the rear and pass down between the teeth $f$, and turn up under the head $e$.

These insure the delivery of any hay that might otherwise adhere to the teeth $f$.

The shafts $n$ extend below the frame $d'$, and are attached by hinges thereto.

The front part of the frame $d'$ can be raised or lowered, relatively to the shafts, or pole $n$, to which the horse or horses are attached.

To effect this, I employ a lever, $o$, on a fulcrum, $Q$, set on the cross-piece $d$, of the frame $d'$, and held in any given position, by the notched segmental bar $p$.

The lower end of the lever $o$ has a pin, that enters a horizontal slot, in the rear face of the cross-piece $n'$, of the shafts $n$, so that by turning the lever $o$ into a more or less inclined position, the forward end of the frame $d\ d'$ will be brought nearer to or moved further from the cross-piece $n'$.

When the forward end of the frame $d$ is drawn, by the lever, down toward the part $n'$ of the shafts, the rake $e$ is raised, so that it will remain entirely clear of the ground, in going to the field or returning.

The spring rake-teeth will be held to their work more or less closely to the ground, according to the position of this lever $o$.

The caster-wheels $q$ are fitted upon arms, that extend from the side-pieces $d'$, and these casters running upon the ground, prevent the teeth, or tines striking into the earth, when the main wheels $a$ may be passing over a depression.

The seat $r$ is supported from the shafts $n$, and may be of any desired character.

A clutch, or coupling is fitted upon the axle $b$, and operated by the lever $s$, so as to connect or disconnect the cone of the pulleys $g$, and $t$ is a catch-spring bar, to hold the lever $s$.

By this construction, the hay-making machine can be set, so that the head $e$ will be turned at the required speed, the height of the said head from the ground easily regulated, or the head entirely raised.

The machine is cheap, strong, and easily repaired, if required.

What I claim, and desire to secure by Letters Patent, is—

1. The revolving head $e$, set upon the side-pieces $d'$, and revolved by the cones of pulleys $g\ h$, in combination with the shafts $n$, hinged to the pieces $d'$, and the axle $b$, of the wheels $a$, as and for the purposes set forth.

2. The spring clearing-rods $m$, supported by the bar $l$, in combination with the revolving head $e$ and spring-teeth $f$, as set forth.

3. The lever $o$, in combination with the shafts $n$, revolving rake-head $e$, axle $b$, and side-pieces $d'$, as and for the purposes set forth.

4. The caster-wheels $q$, applied below the side-pieces $d'$, in combination with the revolving head $e$ and teeth $f$, as and for the purposes specified.

In witness whereof, I have hereunto set my signature, this 26th day of March, A. D. 1869.

DANIEL B. CLEMENT.

Witnesses:
JOHN F. COLBY,
I. E. NOYES.